Patented May 30, 1933

1,912,332

UNITED STATES PATENT OFFICE

EDWARD F. STEINBRING, OF MAPLEWOOD, NEW JERSEY, ASSIGNOR, BY MESNE ASSIGNMENTS, TO KREBS PIGMENT & COLOR CORPORATION, OF WILMINGTON, DELAWARE, A CORPORATION OF DELAWARE

RECOVERY OF ZINC COMPOUNDS FROM TECHNICAL ZINC LIQUORS

No Drawing.  Application filed November 3, 1930.  Serial No. 493,234.

The present invention relates to the recovery in the form of a basic zinc sulfate of zinc compounds from technical impure liquors.

It is well known that the production of high grade lithopones requires the use of raw materials of exceedingly high purity, particularly low chlorine content. On the other hand there are available various technical by-product zinc liquors which contain various impurities, including heavy metal salts, and particularly substantial amounts of chlorine. While it is well known how to free such liquors from heavy metal impurities, the separation of the chlorine from the zinc in such liquors is a rather complicated and expensive procedure.

I have found that alkaline agents will under certain conditions precipitate preferentially a basic zinc sulfate from zinc liquors containing both sulfates and chlorides, and that the so precipitated basic sulfate is substantially free from chlorine.

Basic zinc sulfate, or zinc oxysulfate, is precipitated preferentially over zinc oxychloride by the oxides and hydroxides of the alkali forming metals, which term is used herein to embrace the alkali metals, such as sodium, etc., and the alkaline earth metals and magnesium. Of these basic compounds milk of lime is, of course, the cheapest and the most practical to use.

The composition of the basic sulfate precipitated by alkalis from zinc liquors containing sufficient sulfate is about

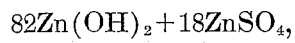

that is to say the hydroxide and sulfate are in the molar ratio of 82:18, or nearly 4.5:1. When the zinc liquors contain both sulfates and chlorides the above basic sulfate will precipitate as long as sufficient $SO_4$ ions are present to form an oxy-sulfate of the above composition.

The molar ratio of 4.5:1 is not understood to correspond to a definite chemical compound, but it represents the average composition of the oxy-sulfate precipitated under various conditions by my novel process. With large amounts of sulfate present a less basic product is obtained, and with amounts of sulfate down to about 15 molar proportions of sulfate to 100 zinc the precipitate will still be substantially chlorine free. The composition of the oxy-sulfate will also depend, to a certain extent, upon the precipitation temperature.

When amounts of soluble sulfates are present in excess of those needed for this oxy-sulfate, formation of alkali or alkaline earth metal sulfates will take place, which products in the case of calcium, strontium and barium will precipitate with the oxy-sulfate. These precipitates can be easily separated from the zinc compounds when the oxy-sulfate is dissolved in sulfuric acid, which is the usual operation to which the oxy-sulfate is submitted to make it available for further use. There is, therefore, no harm in having an excess sulfate in the liquor.

If there is only a small deficiency of sulfate in the solution, zinc oxy-chloride will precipitate after the $SO_4$ has been completely used up in the formation of the oxy-sulfate; the so formed oxy-chloride is easily decomposed by washing with hot water with the formation of insoluble zinc hydroxide and soluble zinc chloride which is washed out. Here again a substantially chlorine free zinc precipitate is obtained, but, of course, there will be a loss of zinc in the form of the soluble zinc chloride which is uneconomic to recover. I, therefore, prefer to use a zinc liquor containing at least 15 molar proportions of sulfate for 100 molar proportions of zinc.

The amounts of basic compound of an alkali forming metal required in my novel process is best determined empyrically by gradual addition of the basic compound until all zinc is removed from the solution. With zinc liquors containing sufficient amounts of sulfate I found that from 75 to 80% of the amounts required theoretically to precipitate all the zinc as the hydroxide is usually sufficient. This refers to practically neutral, or only slightly acid solutions. Strongly acid solutions are preferably neutralized before the addition of the precipitating agent. While this can be done with any basic compound, I find that it is more economical to neutralize the solution with cheap zinc material, such as sal-skimmings, refuse zinc oxide, etc., as available, since their chlorine content does not interfere with the production of a chlorine free zinc compound according to my novel process and, furthermore, an added yield of zinc oxy-sulfate is obtained.

The above chemical reactions relating to the preferential precipitation of a zinc oxy-sulfate from solutions containing chlorides and sulfates is furthermore dependent upon the temperature and they take place mainly below, at room or slightly elevated temperatures. Up to 100° F. there is substantially no precipitation of zinc oxy-chloride, from 100° to about 125° F. noticeable amounts of zinc oxy-chloride are precipitated together with the zinc oxy-sulfate by the action of alkaline precipitating agent. The so precipitated zinc oxy-chloride is, however, easily decomposed by hot water into soluble zinc chloride, which is removed by washing; a final chlorine free zinc oxy-sulfate is, therefore, obtained even when precipitating at temperatures between 100° and about 125° F. Above temperatures of about 125° F. the oxy-chloride is precipitated in such amounts and with such a composition that it is difficult to remove it entirely from the oxy-sulfate by mere washing with hot water. The practical upper temperature limit for the production of a chlorine free oxy-sulfate according to my novel process is, therefore, about 125° F. and for ease of operation and economical reasons I prefer to precipitate the zinc oxy-sulfate at temperatures not exceeding 100° F. The lower temperature limit for my process is the temperature at which the solution freezes.

As will be seen there is no sharp demarcation line in the precipitation conditions which separates the conditions where absolutely no zinc oxy-chloride and where substantial amounts of this compound are precipitated together with the oxy-sulfate. With increasing temperatures the amounts of oxy-chloride formed increase from traces at room temperature to noticeable amounts when temperatures of 125° F. are reached. This, however, does not impair the recovery of a substantially chlorine free zinc compound according to my process. I found the small amounts of oxy-chloride precipitated with the oxy-sulfate below 125° F. to be easily decomposed at higher temperatures by pure water into soluble zinc chloride and chlorine free zinc hydroxide. All I have to do is, therefore, to wash my precipitate with sufficient amounts of hot water, 180–200° F., being the preferred temperatures, which decomposes the oxy-chloride and removes the eventual chlorine content of the oxy-sulfate. This hot washing has the additional advantage that it facilitates the separation of the mother liquor from the oxy-sulfate precipitate, which, if left in the filter cake would contaminate the final product.

There are various zinc liquors technically available from which the zinc content can be obtained in a substantially chlorine free and usable form. Processes removing the copper content from burnt pyrites, such as Rio Tinto ore, yield a spent zinc liquor which contains substantial amounts of zinc as the chloride and sulfate, besides varying amounts of other heavy metal salts, such as iron, manganese, cobalt, nickel, copper and alkali metal salts. It has up to the present been practically impossible to recover from such liquors zinc compounds in a sufficiently pure form to make them available in the chemical arts, such as for the manufacture of white pigments. Such liquors have, at least in this country, been mostly allowed to run to waste. These spent zinc liquors from processes of recovering the copper content of burnt pyrites are exceedingly well suited for the recovery of their zinc content according to my invention.

Other solutions of zinc compounds, such as obtained by dissolving zinc skimmings and other cheap zinc refuse material are likewise worked up economically by my process. In this case the composition of the resulting solution can be easily controlled by the correct choice of acids so that the correct proportion of sulfate to zinc for the formation of the oxy-sulfate is always present.

The heavy metal salt impurities contained in zinc solutions, intended for use in my process, may be removed in well known manner before precipitation of the zinc oxy-sulfate, or may be allowed to remain in the solution, in which case they will precipitate with the oxy-sulfate. In the latter case the combined precipitate is dissolved in sulfuric acid and the solution submitted to the well known purification process for the removal of heavy metal impurities from zinc sulfate solutions. A technically pure zinc sulfate solution is then obtained which is entirely suitable for the manufacture of high grade lithopones.

The following examples will further illustrate my novel process as applied to different zinc liquors:

(1). A zinc liquor from burnt pyrites treatments in which the copper had been removed with scrap zinc and Glauber's salt crystallized out was used. It had the following composition:

| | Grams per liter |
|---|---|
| Zn | 75 |
| $SO_4$ | 55 |
| Cl | 125 |
| Fe | 1.0 |
| Co | .50 |
| Mn | .25 |
| Cu | .50 |
| Ni | .02 |
| CaO | 1.0 |
| MgO | 1.0 |
| Na | 50 |
| Free acidity—as $H_2SO_4$ | 1.0 |

The heavy metal impurity content of this liquor being relatively low, it was submitted directly to my process without purification.

10,000 gallons of this liquor were pumped into a tank of about 2,000 cu. ft. capacity. The temperature of the liquor was about 70° F.

Milk of lime containing about 12% CaO was then prepared in another tank by slaking quicklime in water. This was allowed to cool to about 90° F. and pumped into the above zinc solution. The reaction mixture was efficiently agitated, the milk of lime added over a period of about 60 minutes and stopped when a sample of the liquor filtered showed absence of zinc in the filtrate.

The end point of the precipitation can be more easily determined by pH control of the liquor with the well known pH indicators. The pH during the precipitation remains fairly constant at 6.0 to 6.5 and finally rises sharply at the end. At 8.5 to 9.0 pH the zinc is completely precipitated and at this point the addition of lime is discontinued.

Due to the heat of reaction the temperature of the reaction mixture rose to about 90° F.

The zinc precipitate was then filtered over a rotary filter twice and the cake washed both times on the filter with water of about 180 to 200° F., whereby the cake was freed from its adhering, chlorine containing mother liquor.

The resulting zinc oxy-sulfate was substantially free from chlorine, it contained appreciable amounts of gypsum and substantially all the heavy metal impurities. On analysis it shows the following:

| | Per cent |
|---|---|
| Zn | 41 |
| $SO_4$ combined with Zn | 11.1 |
| Gypsum | 27 |
| Chlorine | 0.07 |

The composition of the oxy-sulfate was substantially $82Zn(OH)_2 + 18ZnSO_4$.

The precipitate was then made available for the manufacture of lithopone by dissolving the oxy-sulfate in dilute sulfuric acid, filtering the solution from the insoluble gypsum and removing the heavy metal impurities by well known methods.

(2). A spent zinc liquor from burnt pyrites treatment was used, its composition being similar to that of Example 1, except that it contained about 15 grams Fe and free acidity of about 15 grams $H_2SO_4$ per liter.

Sal skimmings were added to said liquor to neutralize the free acid. The solution was then treated by well known methods to remove the heavy metal compounds therefrom and a liquor was obtained which contained substantially only zinc sulfate, zinc chloride and alkali metal salts. Milk of lime was then added at about 80° F. to the solution until the zinc was completely precipitated. The precipitate was then filtered off, washed with hot water until free from mother liquor and a zinc oxy-sulfate, mixed with gypsum and substantially free from chlorine was obtained. It had the composition:

| | Per cent |
|---|---|
| Zn | 55 |
| $SO_4$ combined with zinc | 15 |
| Gypsum | 12 |
| Chlorine | 0.1 |

(3). Sal skimmings were dissolved in a mixture of dilute hydrochloric and sulfuric acids whereby a neutral solution was obtained of the composition:

| | Grams per liter |
|---|---|
| Zn | 100 |
| Cl | 87 |
| $SO_4$ | 30 |

This solution contained only slightly more $SO_4$ than is theoretically required for the formation of my zinc oxy-sulfate.

This solution was then treated with milk of lime, under the conditions of Example 1, and washed with hot water until the mother liquor was removed from the zinc oxy-sulfate precipitate. The product contained very little gypsum and was for all practical purposes sufficiently free from chlorine. The composition of the zinc oxy-sulfate was:

| | Per cent |
|---|---|
| Zn | 58 |
| $SO_4$ combined with Zn | 16.2 |
| Gypsum | 0.5 |
| Chlorine | 0.08 |

While the above examples disclose the use of milk of lime only as the precipitating agent for my zinc oxy-sulfate, it will be understood that other basic compounds of alkali forming metals or the oxides and hydroxides of sodium, potassium, calcium, magnesium, strontium and barium could be used to the same advantage when economically available.

I claim:

1. The process of precipitating a zinc oxy-sulfate which comprises adding to a zinc liquor containing at least 15 molar proportions of a sulfate for each 100 molar proportions of zinc, an amount of a basic alkaline earth metal compound at least sufficient to free the liquor from its zinc content, separating the precipitate from the mother liquor and washing it until free from chlorine, the temperature during precipitation being kept below 125° F., and during washing above 125° F.

2. The process of precipitating a zinc oxysulfate which comprises adding to a zinc liquor containing at least 15 molar proportions of a sulfate for each 100 molar proportions of zinc, an amount of a caustic alkali at least sufficient to free the liquor from its zinc content, separating the precipitate from the mother liquor and washing it until free from chlorine, the temperature during precipitation being kept below 125° F. and during washing above 125° F.

3. The process of precipitating a zinc oxysulfate which comprises adding to a zinc liquor containing at least 15 molar proportions of a sulfate for each 100 molar proportions of zinc, an amount of a basic compound of an alkali forming metal at least sufficient to free the liquor from its zinc content, separating the precipitate from the mother liquor and washing it until free from chlorine, the temperature during precipitation being kept below 125° F., and during washing above 125° F.

4. The process of precipitating a zinc oxysulfate which comprises adding to a zinc liquor containing at least 15 molar proportions of a sulfate for each 100 molar proportions of zinc, an amount of milk of lime at least sufficient to free the liquor from its zinc content, separating the precipitate from the mother liquor and washing it until free from chlorine, the temperature during precipitation being kept below 125° F. and during washing above 125° F.

In testimony whereof, I affix my signature.

EDWARD F. STEINBRING.